United States Patent [19]

Kauffman et al.

[11] 4,050,876

[45] Sept. 27, 1977

[54] ROTARY STRETCH BLOW MOLDING APPARATUS

[75] Inventors: Ivan L. Kauffman, Commerce; Robert C. Kellogg, Hartland, both of Mich.

[73] Assignee: Monsanto Company, St. Louis, Mo.

[21] Appl. No.: 683,254

[22] Filed: May 5, 1976

Related U.S. Application Data

[62] Division of Ser. No. 415,851, Nov. 14, 1973.

[51] Int. Cl.² .............................................. B29D 23/03
[52] U.S. Cl. .................................... 425/529; 425/535; 425/537; 425/540
[58] Field of Search ........... 425/DIG. 211, DIG. 213, 425/DIG. 216, DIG. 232, 387 B, DIG. 204, 342

[56] References Cited

U.S. PATENT DOCUMENTS

| | | | |
|---|---|---|---|
| 3,179,041 | 4/1965 | Luthi et al. | 425/455 |
| 3,275,726 | 9/1966 | Rudolph | 425/326 B |
| 3,314,110 | 4/1967 | Missbach | 425/384 |
| 3,415,915 | 12/1968 | Lecluyse et al. | 425/DIG. 211 |
| 3,431,594 | 3/1969 | Schenck et al. | 425/455 |
| 3,496,597 | 2/1970 | Ayres | 425/392 X |
| 3,599,280 | 8/1971 | Rosenkranz et al. | 425/DIG. 203 |
| 3,776,991 | 12/1973 | Marcus | 425/DIG. 216 |
| 3,809,521 | 5/1974 | La Fosse | 425/DIG. 213 |
| 3,864,445 | 2/1975 | Dean | 425/DIG. 213 |
| 3,924,998 | 12/1975 | Moore | 425/DIG. 232 |

FOREIGN PATENT DOCUMENTS

| | | | |
|---|---|---|---|
| 1,314,044 | 11/1962 | France | 425/DIG. 205 |
| 1,166,893 | 10/1969 | United Kingdom | 425/DIG. 204 |

*Primary Examiner*—Richard B. Lazarus
*Attorney, Agent, or Firm*—Michael J. Murphy

[57] ABSTRACT

A continuous motion stretch blow molding apparatus for blow molding hollow articles from tubular parisons. A rotary parison loading turret loads parisons sequentially onto a plurality of stretch pin means operatively carried on a continuous motion transfer means which then conveys each of said stretch pin means into an operative position in a molding station on a continuous motion multi-station rotary molding turret. The parisons are stretched longitudinally, blown to form a final article, cooled in the molding stations, and then said article is ejected.

11 Claims, 25 Drawing Figures

ROTARY STRETCH BLOW MOLDING APPARATUS

SUMMARY OF THE INVENTION

This is a division of copending application Ser. No. 415,851, filed Nov. 14, 1973.

This invention relates to the stretch blow molding art, and more particularly, to a continuous motion stretch blow molding apparatus for blow molding hollow articles from tubular parisons. Heretofore, various types of machines have been proposed for blow molding preformed parisons to form hollow articles. A disadvantage of such prior art blow molding machines is that they include indexing operations which produce very high acceleration and deceleration forces, which require added machine structure at additional costs to overcome such forces. A further disadvantage of said prior art indexing blow molding machines is that they are not capable of high speed fabrication of hollow articles to supply the present day need for low cost production of such articles. Accordingly, in view of the foregoing, it is an important object of the present invention to provide a novel and improved continuous motion stretch blow molding apparatus which overcomes the aforementioned disadvantages of the prior art blow molding machines.

It is another object of the present invention to provide a novel and improved continuous motion stretch blow molding apparatus which is capable of high speed fabrication of hollow articles at a low cost.

It is a further object of the present invention to provide a novel and improved continuous motion stretch blow molding apparatus for blow molding hollow articles from tubular parisons including, a continuous motion transfer means, a plurality of upwardly disposed stretch pin means operatively carried on said transfer means, a continuous motion rotary parison loading turret for receiving parisons and for sequentially loading them onto said stretch pin means, a continuous motion rotary molding turret having a plurality of molding stations, said transfer means being operative to locate each of said stretch pin means with a parison loaded thereon in an individual one of said molding stations for a stretching, blowing and cooling operation on each parison on each stretch pin means to form an article from each parison, and ejection means operative to automatically eject each article upwardly from each stretch pin means.

It is still a further object of the present invention to provide a novel and improved continuous motion stretch blow molding apparatus which includes an ejection means for automatically ejecting articles formed by the blow molding apparatus.

Other objects, features and advantages of this invention will be apparent from the following detailed description, appended claims, and the accompanying drawings.

DESCRIPTION OF THE PREFERRED EMBODIMENT

The blow molding apparatus of the present invention is constructed and arranged to provide continuous, high speed fabrication of hollow thermoplastic articles, as bottles and the like. Heated tubular parisons or preforms are loaded at a rotary loading turret on stretch pin assemblies which are carried on a constant speed transfer means that conveys the stretch pin assemblies, in a predetermined sequence, into operative positions within molding stations on a multi-station blow molding rotary turret. The parisons are stretched longitudinally, blown to the final form of an article, cooled, and thereafter ejected, all in a continuous operation.

General Machine Description

Figure 1:
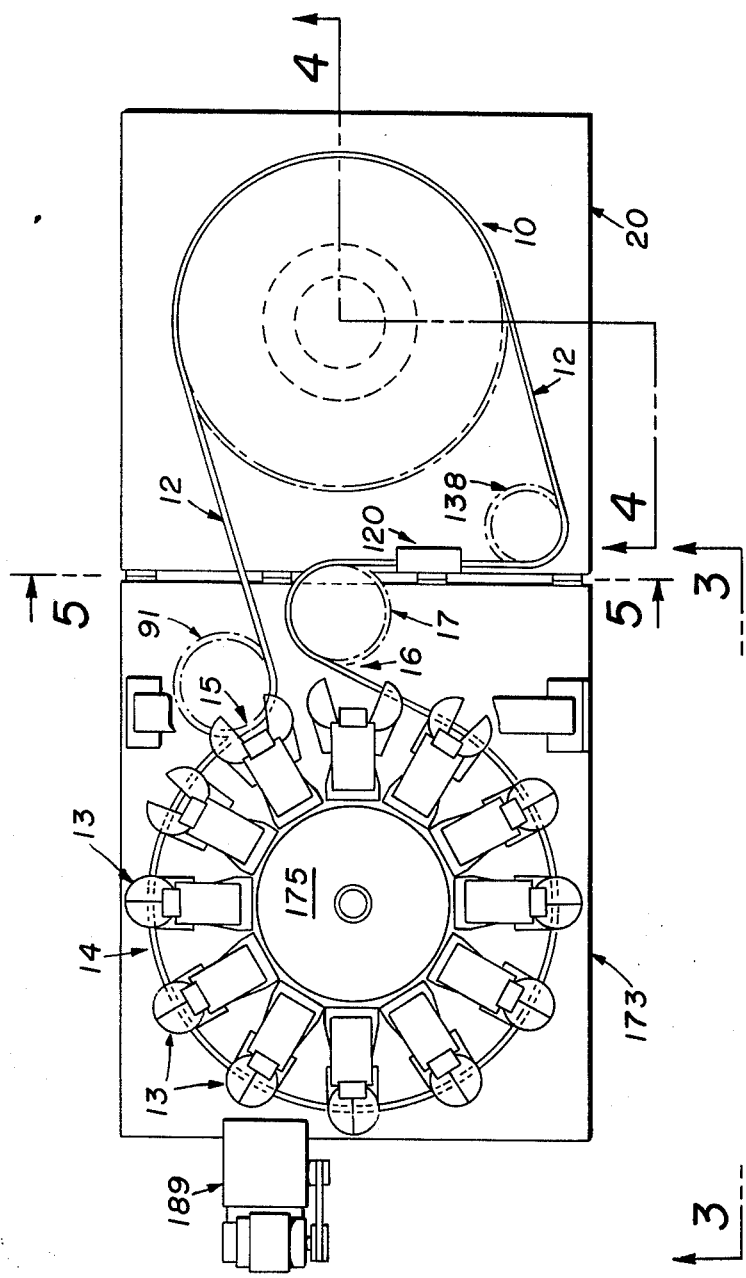
FIG. 1 is a schematic top plan view of a rotary stretch blow molding apparatus made in accordance with the principles of the present invention.
Figure 2:
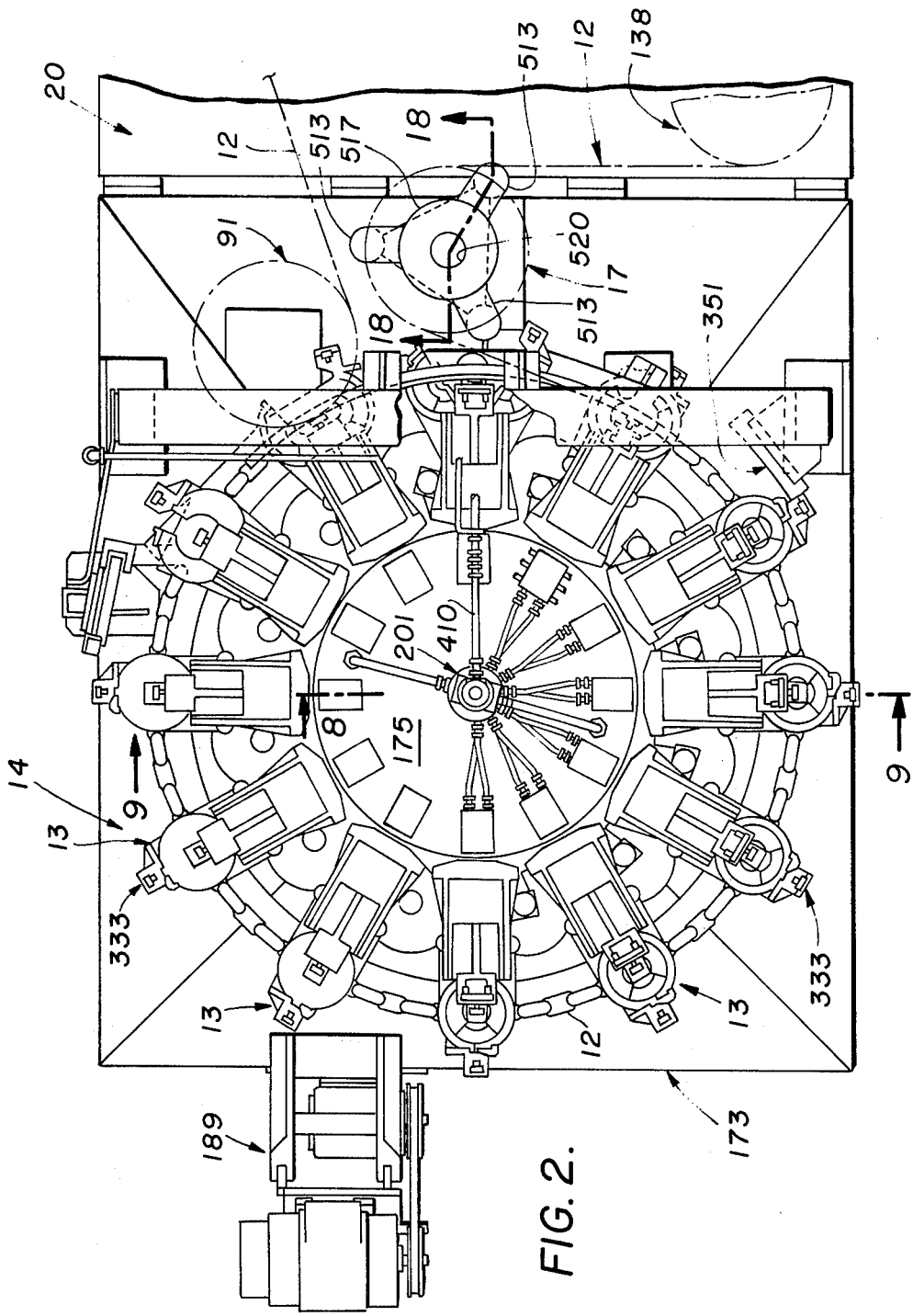
FIG. 2 is an enlarged top plan view of the main turret illustrated on the left side of FIG. 1 that carries the parison stretching, blowing and chilling apparatus, and eject apparatus.
Figure 3:
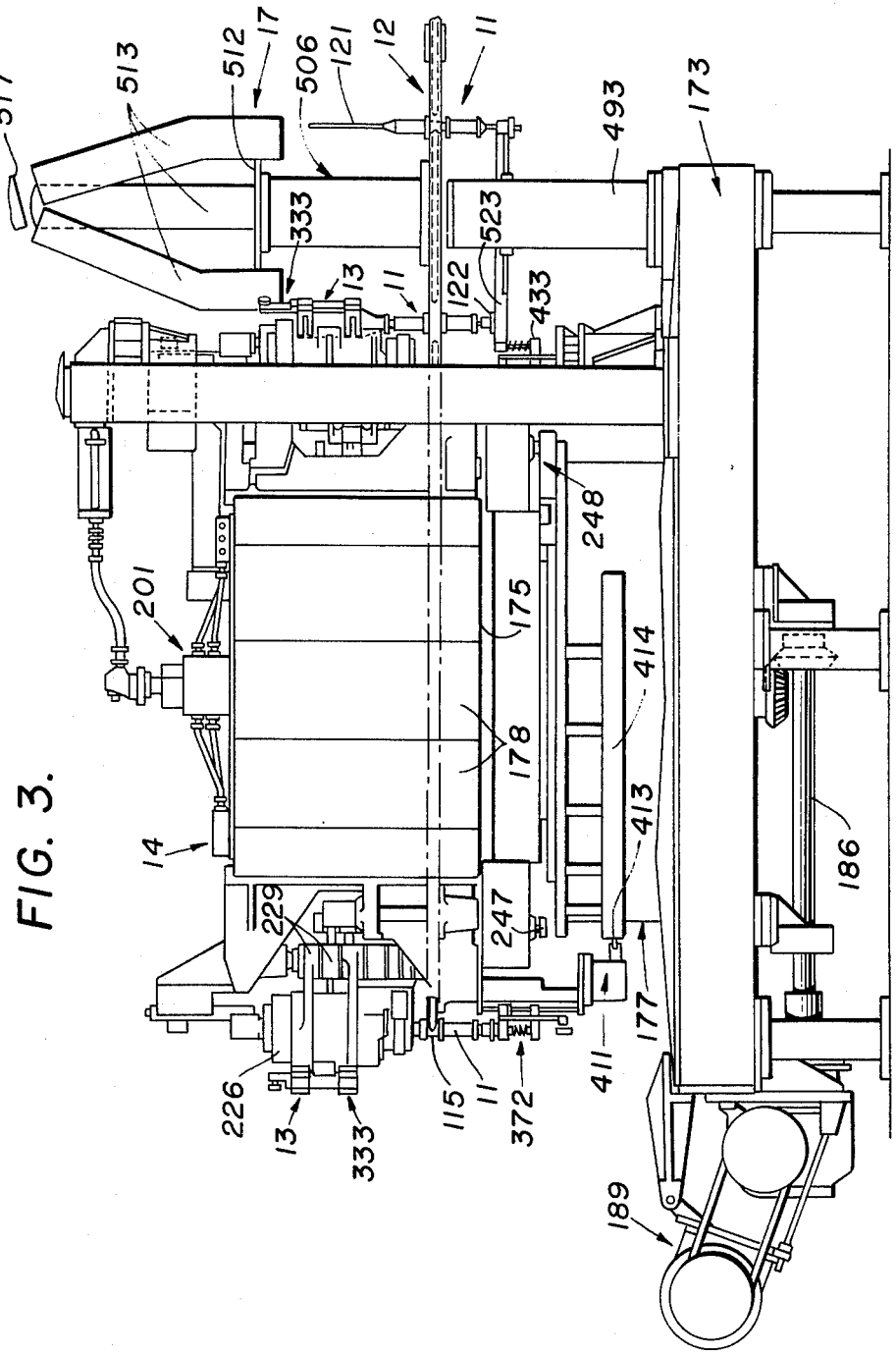
FIG. 3 is a fragmentary, enlarged, elevational view of structure illustrated in FIG. 1, taken along the line 3—3 thereof, and looking in the direction of the arrows.

Referring now to the drawings, and in particular to FIG. 1 which is a top plan view of a continuously operating machine made in accordance with the principles of the present invention, the numeral 10 generally designates a multi-station parison loading turret which receives heated tubular parisons and loads them in a predetermined sequence onto upwardly disposed individual stretch pin assemblies of the type generally indicated by the numeral 11 in FIG. 3. The stretch pin assemblies 11 are operatively mounted on a constant speed transfer means, generally indicated by the numeral 12, and which comprises a continuous standard pitch roller chain. The tubular parisons are located longitudinally and transversely on the stretch pin assemblies 11. The transfer means 12 conveys the stretch pin assemblies 11 at a constant speed into operative positions within individual molding stations 13 on a multi-station blow molding rotary turret, generally indicated by the numeral 14 in FIGS. 1, 2 and 3. The rotary turret 14 rotates at constant speed and moves the stretch pin assemblies 11 between a load position 15 and an unloading position 16, as shown in FIG. 1. The parisons are stretched longitudinally, blown to the final form of an article, as a bottle, and cooled, between the load and unload positions 15 and 16, respectively. The transfer means 12 conveys each of the stretch pin assemblies 11 with its formed article from its respective molding station 13 at the unloading position 16 and thence around an article ejection means, generally indicated by the numeral 17 in FIGS. 1 and 3.

The apparatus of the present invention is applicable for the formation of hollow thermoplastic articles, such as bottles and other containers. Any suitable thermoplastic resin can be used in forming the parisons. Examples of a suitable resin would include polymers and copolymers of polypropylene. The resin may be extruded or molded into the parisons or preforms, and cooled to a temperature below their crystalline freezing point. The parisons are then heated in a suitable oven to a plastic stage or orientation temperature and conveyed by suitable means to the aforedescribed parison loading rotary turret 10.

The apparatuses for forming the parisons, and for heating and conveying the parisons to the loading rotary turret 10, do not form any part of this invention, and any suitable such apparatuses may be employed.

Parison Loading Rotary Turret

Figure 4:
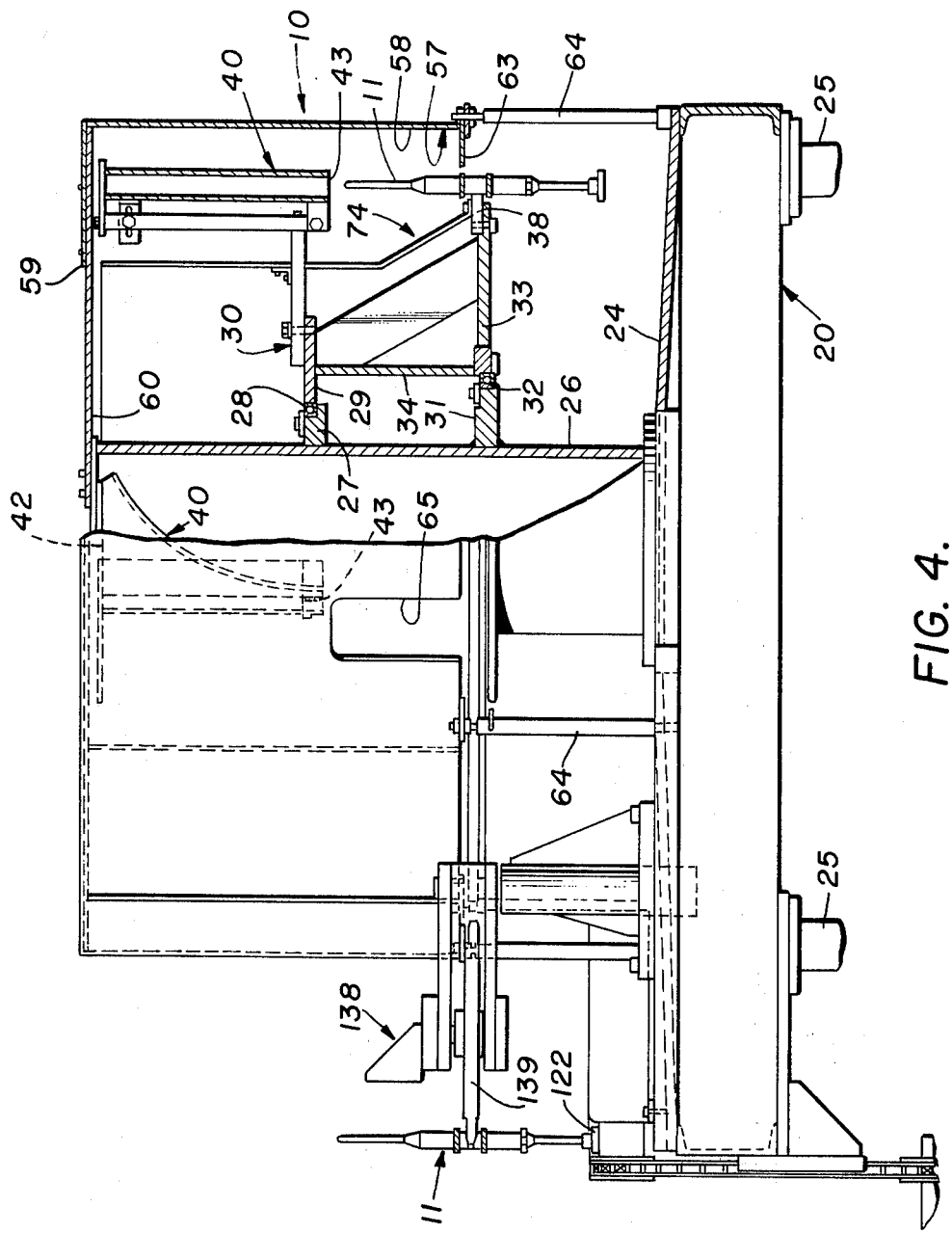
FIG. 4 is a fragmentary, elevational section view of the structure illustrated in FIG. 1, taken along the line 4—4 thereof, and looking in the direction of the arrows.

As shown in FIGS. 1 and 4, the parison loading rotary turret 10 is operatively mounted on a suitable base, generally indicated by the numeral 20 which includes a fixed plate 24 operatively carried by channel members and supported by four ground-engaging legs indicated by the numeral 25.

As shown in FIG. 4, the parison loading rotary turret 10 includes a tubular fixed column 26 which is fixedly mounted in a central position on the base 20. A circular flange 27 is fixedly mounted on the column 26 by any suitable means at a position spaced downwardly from the upper end. The flange 27 operatively supports a circular bearing means 28 on which is rotatably supported a horizontal, radially extended upper circular carrier plate 29 which forms a part of a rotary carrier member, generally indicated by the numeral 30. A second circular flange 31 is fixed on the column 26 at a point spaced downwardly from flange 27, and it operatively supports a second circular bearing means 32. A lower circular carrier plate 33 is rotatably supported on the bearing means 32, and it is fixedly joined to the upper carrier plate 29 by a cylindrical support member 34.

Figure 5:
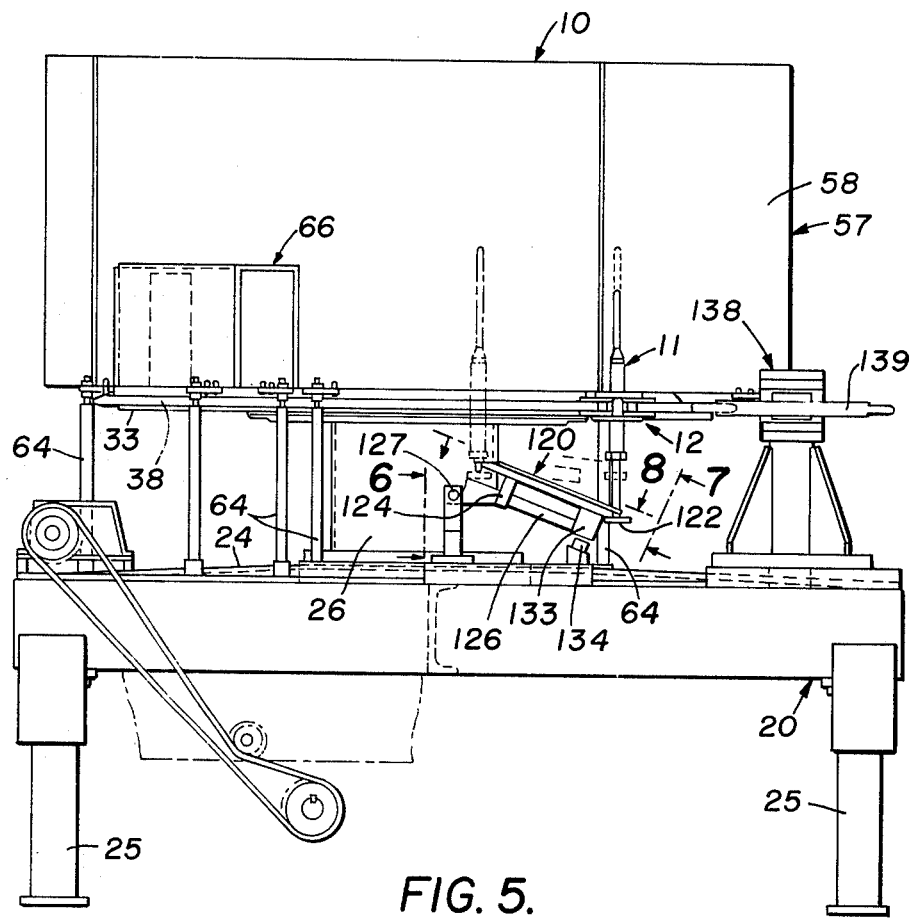
FIG. 5 is a fragmentary, elevational view of the structure illustrated in FIG. 4, taken along the lines 5—5 of FIG. 1, and looking in the direction of the arrows.

As shown in FIGS. 4 and 5, a circular sprocket 38 is fixedly mounted on the lower carrier plate 33. The sprocket 38 is operatively engaged for a distance of about 180° around the periphery thereof by the chain of transfer means 12. The constant speed of transfer means 12 is thus imparted to the rotary carrier 30 and it moves with the transfer means 12.

The parison loading rotary turret 10 includes ten loading stations, each of which is provided with a loading chute generally indicated by the numeral 40. Each of the parison loading chutes 40 is adjustably mounted on the carrier member 30. As shown in FIG. 4, the side view of a loading chute 40 shows the chute to be substantially gun holster shaped with the upper end 42 being open and the lower end 43 being open.

As shown in FIGS. 4 and 5, the parison loading rotary turret 10 is provided with an outer fixed shroud, generally indicated by the numeral 57. As shown in FIG. 4, the fixed shroud 57 includes an outer cylindrical, vertical wall 58 which has integrally formed on the upper end thereof a horizontal and inwardly extended circular wall 59 secured to the column 26 by a plurality of horizontal support arms 60. The fixed shroud 57 includes a lower horizontal circular wall 63, as shown in FIG. 4, which extends inwardly from the lower end of the wall 58 to a point adjacent the path of the stretch pin means 11 as they pass around the rotary carrier member 30. The fixed shroud 57 is fixedly suppoted by a plurality of support posts 64 which have their lower ends suitably fixed to the base plate 24 by any suitable means. As shown in FIG. 4, the shroud vertical wall 58 is provided with an entrance opening 65 for the passage therethrough of the stretch pin means 11 as they are conveyedinto the shroud 57 by the transfer means 12.

Figure 15:
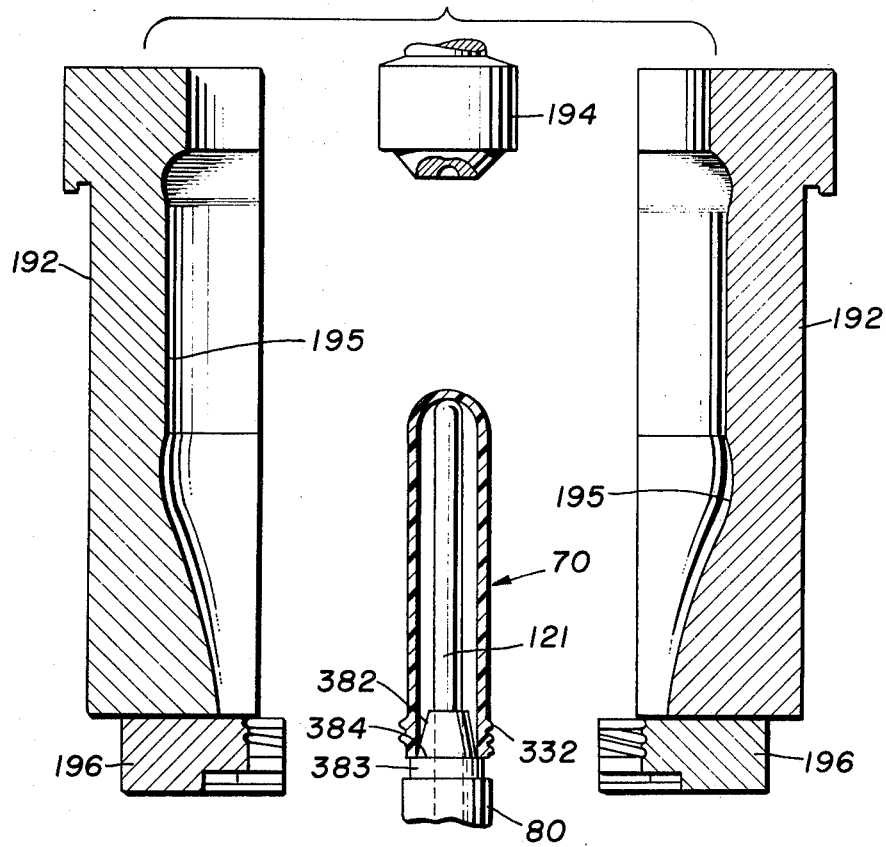
FIG. 15 is a fragmentary, enlarged, elevational section view of the mold structure illustrated in FIG. 14, taken along the line 15—15 thereof, and looking in the direction of the arrows.
Figure 16:
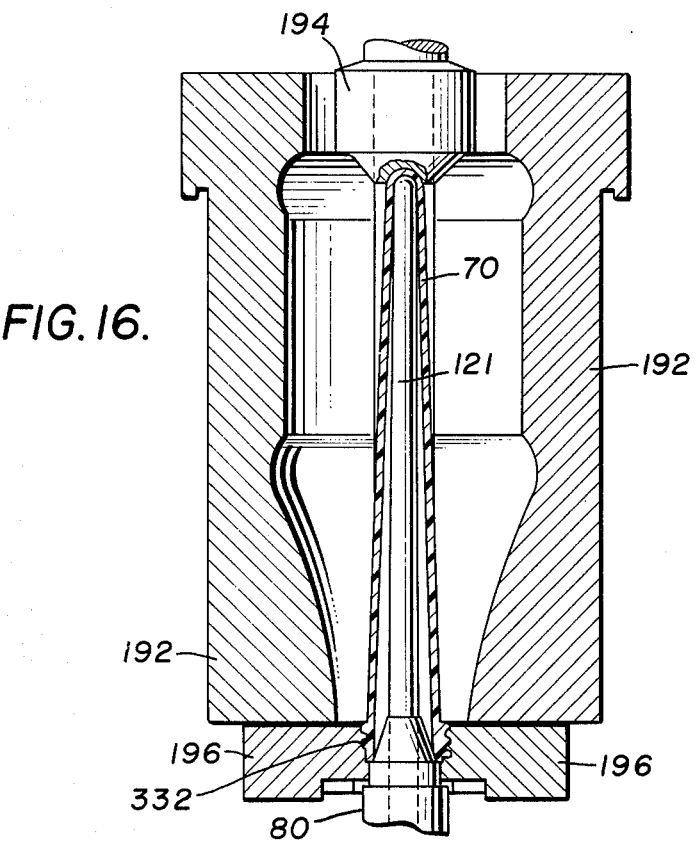
FIG. 16 is a view similar to FIG. 15, and showing the parison stretched prior to being blown into a bottle.

As shown in FIG. 5, the fixed shroud 57 has fixedly connected thereto an exit tunnel, generally indicated by the numeral 66, out through which pass the stretch pin means 11 after they have been loaded with a parison. Each of the stretch pin means 11 exits from the parison loading rotary turret 10 with an inverted parison, generally indicated by the numeral 70, mounted on the upper end thereof. The parisons 70 are substantially test tube shaped and they have a thread formed around the open end thereof (FIG. 15).

As shown in FIG. 4, the rotary carrier member 30 supports a moving heat shield, generally indicated by the numeral 74, which is secured to lower carrier plate 33, and to support arms 48. The shrouds 58 and 74 function to prevent heat loss from the parisons 70 to the surrounding atmosphere as the parisons are conveyed through the loading rotary turret 10 and into a mold station 13 on the molding turret 14.

A parison loading opening (not shown) is formed through the upper end wall 59 of the fixed shroud 58 to form a parison loading position. The heated parisons 70 may be dropped through the loading opening by any suitable means, as for example a plurality of parisons, as five at a time, may be carried by a horizontal pallet and then sequentially dropped, one at a time, in an inverted position through the opening in sequence. The opening is formed in a straight line to permit sequential dropping from a straight line pallet. The chutes 40 are adjusted so that they are timed to receive a parison 70 at a predetermined position. The opening and the chutes 40 are constructed and arranged so as to be able to receive parisons 70 dropped at a number of points along a straight line, as for example ten parison drop points. The parisons 70 are dropped through the opening in a predetermined sequence so that they fall into the high end of each of the chutes 40. The parison 70 then falls down the face of the parabola shaped wall and strikes the vertical back wall portion of the chute 40. Then it is captured in the narrow neck of the lower funnel shaped end of the cute, and it passes through the lower open end 43 and onto a stretch pin means 11 which is timed to be disposed under the open end 43 of each chute 40 at the parison drop time.

Stretch Pin Transfer Means

The stretch pin transfer means includes the continuous standard pitch roller chain 12 which passes around the parison loading turret 10, and the molding turret 14, and around the ejection means 17. The chain 12 is driven at a constant speed which is commensurate with the machine speed.

Figure 11:
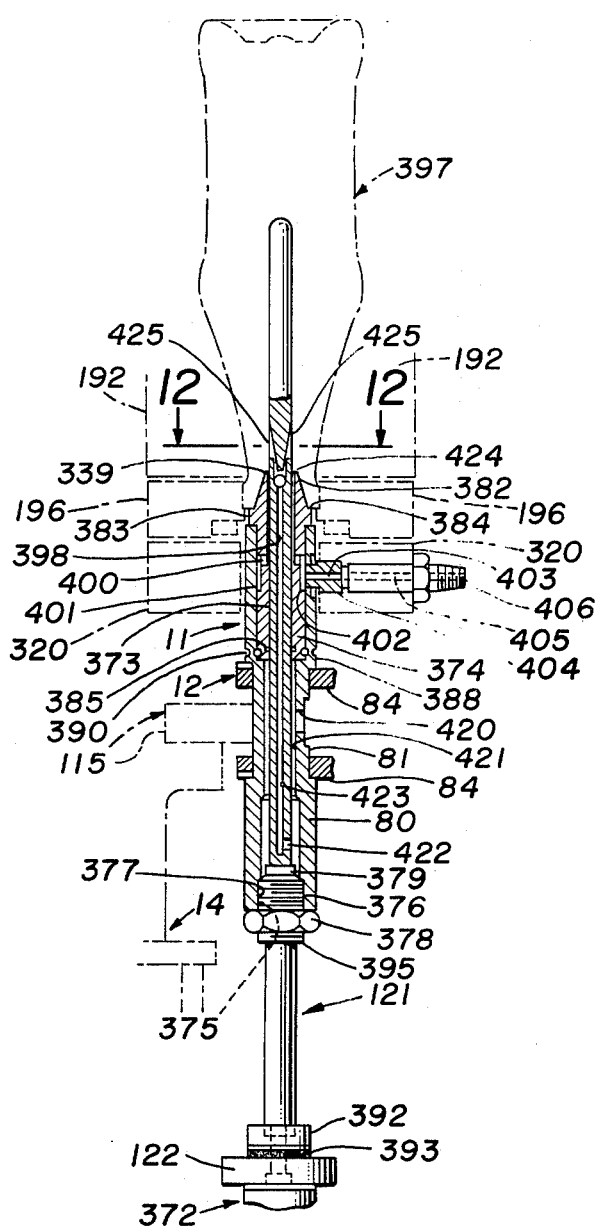
FIG. 11 is a fragmentary, enlarged, elevational, sectional view of the structure illustrated in FIG. 10, and taken in the direction of the arrow "11".
Figure 12:
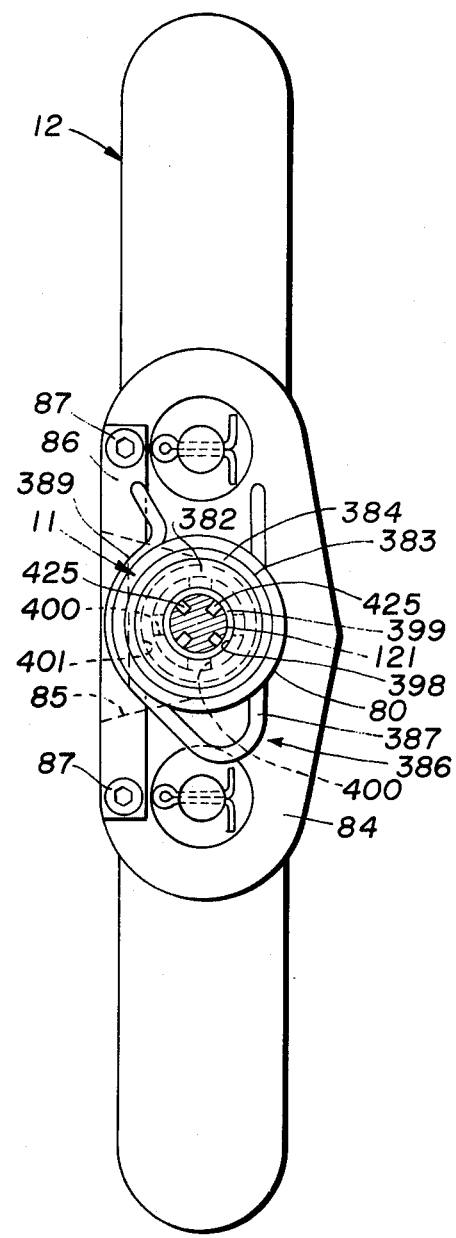
FIG. 12 is an enlarged, horizontal, section view of the structure illustrated in FIG. 11, taken along the line 12—12 thereof, and looking in the direction of the arrows.

As shown in FIG. 11, each of the stretch pin means or assemblies 11 includes a cylindrical body 80 which is provided with a reduced annular recess or reduced diameter portion 81 intermediate the ends thereof. The stretch pin assemblies 11 are releasably carried by the transfer chain 12 by means of a pair of chain attachment plates 84. As shown in FIG. 12, each of the plates 84 is provided with a hole therethrough for reception of the stretch pin body portion 81, and a diverging, outward opening 85 so as to permit mounting of the pair of plates 84 around said body portion 81. Each chain attachment plate 84 is then secured to a stretch pin assembly body 80 by a retainer plate 86 that is disposed over the entrance opening 85 and secured in place by a pair of suitable machine screws 87.

As shown in FIGS. 1 and 2, the transfer means chain 12 leaves the parison loading rotary turret 10, and then passes to the left and around an input idler means, generally indicated by the numeral 91, which guides the chain 12 so as to bring it in tangent to the molding turret 14, and to properly insert each of the stretch pin assemblies 11 into its respective mold assembly 13. The wheel of means 91 has three evenly, peripherally spaced notches, not shown, for the reception of stretch pin assembly bodies 80 as they pass around means 91.

Figure 10:
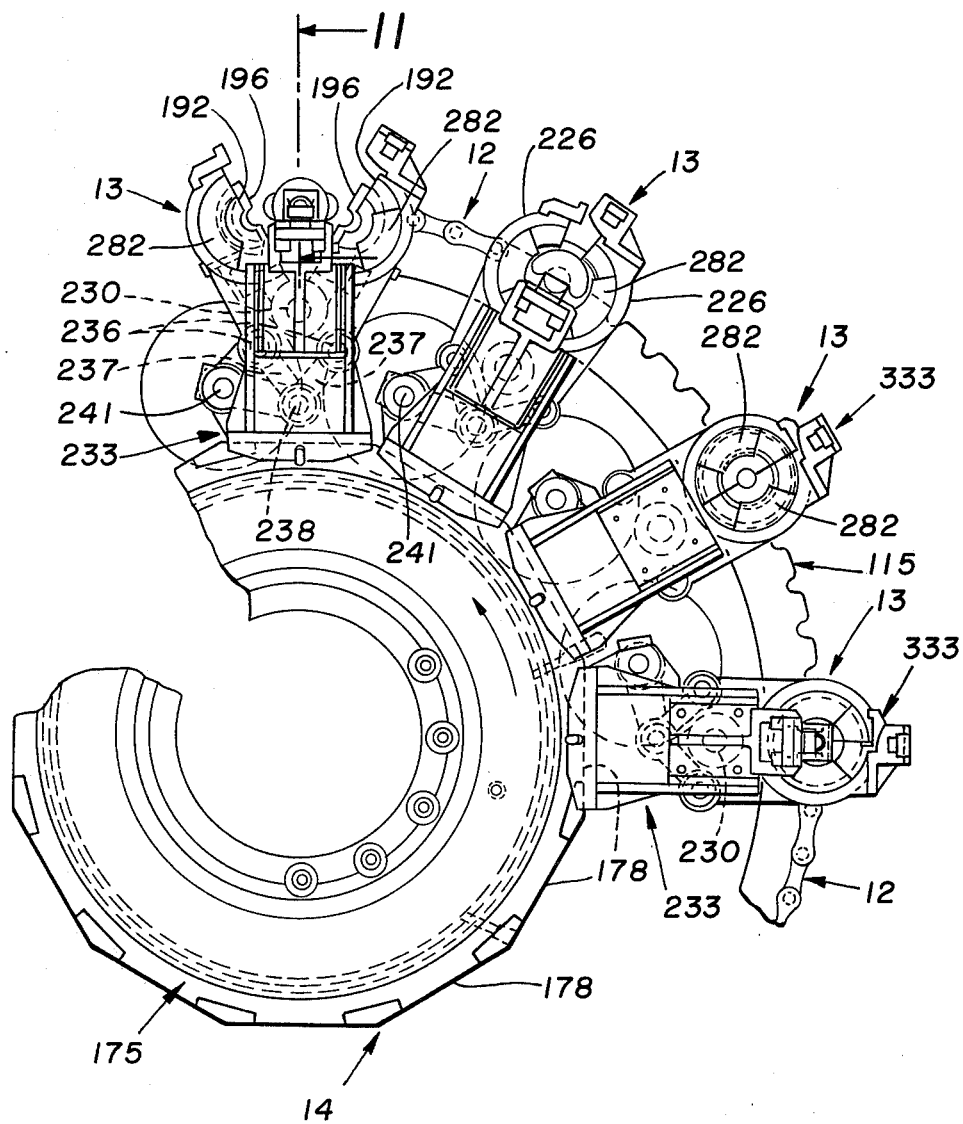
FIG. 10 is a fragmentary, top, plan view of the structure illustrated in FIG. 9, taken along the line 10—10 thereof, and looking in the direction of the arrows.

As shown in FIG. 2, the chain 12 passes around means 91 which times the chain 12 so as to bring the stretch pin assemblies 11 into operative engagement with a molding turret circular sprocket, generally indicated by the numeral 115 in FIG. 10. The turret sprocket 115 is provided with a suitable notch at each of the molding stations 13, for locating and for reception of a stretch pin assembly 11.

As shown in FIG. 2, the transfer means chain 12 passes around the molding rotary turret 14 and then carries the stretch pin assemblies 11 off molding rotary turret 14 and tangentially onto and around the rotary ejector means 17, which will be described in detail hereinafter.

As shown in FIG. 1, the transfer chain 12 carries the stretch pin assemblies 11 from the ejection means 17 into operative engagement with a cam means 120 for camming the stretch pin 121 downwardly to an initial parison receiving position. As shown in FIG. 11, the stretch pin 121 is slidably mounted in the stretch pin assembly body 80 and it carries on its lower end a circular block 122.

As shown in FIG. 5, each of the stretch pin assemblies 11 is carried by the chain 12 through the cam means 120 which engages the circular block 122 and moves said block and the stretch pin 121 downwardly, from the dotted line to the solid line position shown in FIG. 5.

Figure 6:
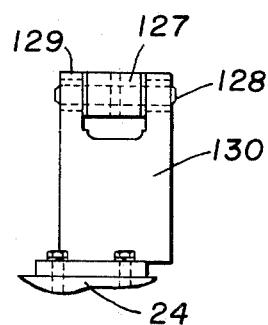
FIG. 6 is a fragmentary, enlarged, elevational view of the structure illustrated in FIG. 5, taken along the line 6—6 thereof, and looking in the direction of the arrows.
Figure 7:
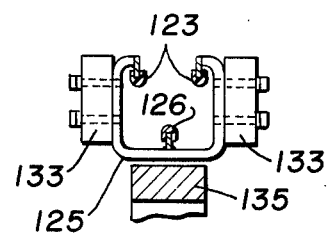
FIG. 7 is a fragmentary, enlarged, elevational sectional view of the structure illustrated in FIG. 5, taken along the line 7—7 theeof, and looking in the direction of the arrows.
Figure 8:
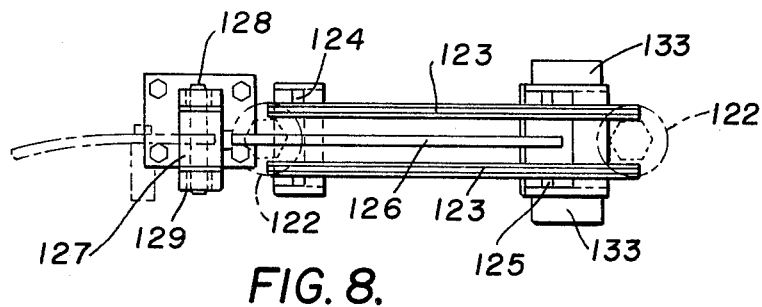
FIG. 8 is a fragmentary, enlarged, plan view of the structure illustrated in FIG. 5, taken along the line 8—8 thereof, and looking in the direction of the arrows.

The stretch pin cam means 120 is shown in detail in FIGS. 6, 7 and 8. As best seen in FIGS. 7 and 8, the stretch pin cam means 120 comprises an upper pair of spaced apart, elongated parallel rails 123 which are fixedly mounted at their entrance or forward ends on a U-shaped bracket 124, and at their exit or rear ends on a U-shaped bracket 125. A lower parallel rail 126 is disposed downwardly from the upper rails 123 and in a central position therebetween. The lower rail 126 is also fixedly mounted on the channelshaped brackets 124 and 125. The forward end of the lower rail 126 is fixedly secured to a journal member 127. The journal member 127 is rotatably mounted on a suitable shaft 128 which is supported between the upper bifurcated end 129 of a vertical support plate 130.

As shown in FIG. 7, a pair of weight blocks 133 are secured to the outer face of the U-shaped bracket 125 at the discharge end of the rails 123 and 126, so as to normally bias the cam means 120 into engagement with a stop member 135 which is positioned on the parison loading rotary turret plate 24. The pivotal mounting of the cam means 120 permits the cam means to swing upwardly, in a counterclockwise direction as viewed in FIG. 5, to relieve pressure on the stretch pin block 122 indicating a jam condition if a parison is stuck on the stretch pin. The weights 133 are effective to return the cam means 120 to the operative position to move the stretch pin block 122 downward to move the stretch pin to the desired level.

As shown in FIGS. 1 and 4, the numeral 138 generally indicates a transfer chain take-up means for maintaining the chain 12 at the proper tightness, without slack, and includes a freely rotatable sprocket 139 around which the chain 12 passes.

Molding Rotary Turret

As shown in FIG. 3, the molding rotary turret 14 includes a base, generally indicated by the numeral 173, suitably supported by a plurality of support legs. The molding rotary turret 14 includes a rotary turret 175 which is rotatably mounted by suitable bearings on a support pedestal and column 177 carried on the base 173. Turret 175 is provided with 12 vertical flat mounting areas 178 at each of which is operatively mounted one of the molding stations 13.

The turret drive shaft 186 is operatively connected to and driven by a suitable electric motor power drive means, generally indicated by the numeral 189. It will be seen (FIG. 3) that the power drive means 189 provides the constant drive speed for the entire machine through the co-action of the chain means 12.

Each of the 12 molding stations 13 on the molding rotary turret 14 is provided with a five-piece mold. As shown in FIG. 15, the mold at each of the molding stations 13 includes a pair of side pieces or mold halves indicated by the numeral 192. The mold side pieces 192 are semi-circular in cross section and are provided at the upper end thereof with semi-circular central openings in which is operatively received the mold bottom end cap or end plug 194. The mold side pieces 192 each have a cavity 195 formed therein for molding an article, which in this instance comprises a bottle. The inner face of the mold end plug 194 is shaped to form the bottom end of the bottle. The mold includes a pair of neck ring clamps 196.

The aforedescribed mold parts are conventionally water cooled and they are supplied with cooling water from a rotary manifold generally indicated by the numeral 201 and mounted on top of the turret 175. Cooling water is supplied to the mold neck clamp parts 196 by passing cooling water to and from the mold halves 192, and cooling water is supplied to each of the mold bottom end plugs 194 also through a suitable conduit.

Figure 9:
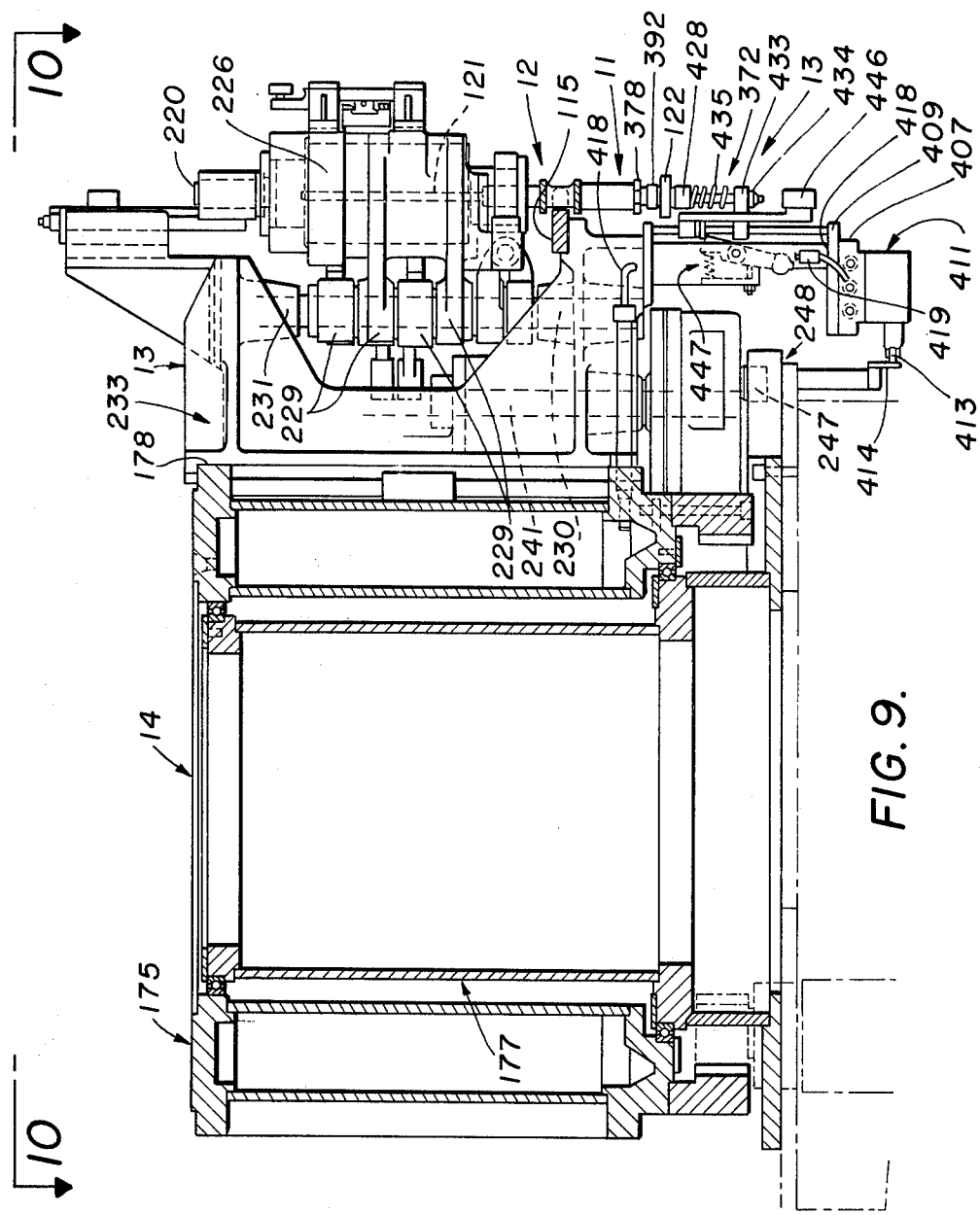
FIG. 9 is a fragmentary, enlarged, elevational, section view of the structure illustrated in FIG. 2 taken along the line 9—9 thereof, and looking in the direction of the arrows.

As shown in FIGS. 9 and 10, each of the mold halves 192 are releasably secured to an individual mold carrier 226. Each of the mold carriers 226 is provided with a pair of hubs 229 which are pivotally mounted by suitable bearing means on a vertical support shaft 230. The support shaft 230 is mounted in suitable bearings in an upper boss 231 and a similar lower boss which are operatively mounted on a mold station housing 233 fixedly secured by suitable machine screws to its respective mold staion 178 on the mold rotary turret 175.

The mold carriers 226 are moved between the closed and open positions by suitable mechanical structure. Mold carrier operating shaft 241 is journaled in an upper journal member and a lower journal member, each of which is operatively carried on its respective mold staion housing 233. Operatively attached to the lower end of the shaft 241 is a mold actuator which carries a cam follower 247 that operatively engages a mold actuator cam generally indicated by the numeral 248 (FIG. 3). The mold actuator rotates the shaft 241 so as to move the shaft 238 (FIG. 10) and suitable mold operating levers 237 which in turn move with pivot shafts 236 to cause carriers 226 to pivot about shaft 230 to in turn move sections 192 (FIG. 10).

The mold actuator cam 248 is provided with a cam track which is formed to move cam follower 247 for the appropriate camming operations as the molding rotary turret 14 turns. The zero degree position (FIG. 1) of the molding rotary turret 14 is shown to be disposed at a point in the rotary travel of the molding turret 14 where the transfer means chain 12 is passing away from the molding rotary turret 14 and onto the ejector means 17. The mold pieces 192 are in an open position at this point and they continue counterclockwise on to a 20° position where the mold pieces 192 are still open. When a molding station 13 is moved to a 45° position in FIG. 1, the cam follower 247 is cammed to move the mold pieces 192 to a partially closed position. At the 60° position, the cam track operates on the cam follower 247 to rotate shaft 241 (FIG. 9) so to move the mold pieces 192 to the cloed position when the molding rotary turret 14 reaches the 70° point. Continued movement then moves the cam follower 247 out of the cam track during the blow molding operation. When a molding station reaches the 320° point of travel, the cam follower 247 is again actuated by the cam track to commence opening the mold pieces 192.

Figure 14:
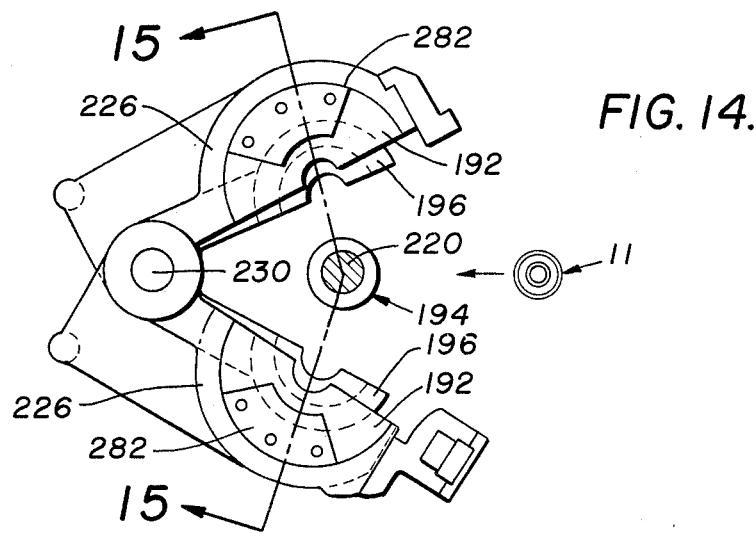
FIG. 14 is a top view of the mold employed in the invention and showing the mold halves swung to an open position for the reception of a parison.

FIG. 14 shows a plan view of mold plug clamps 282 which are clamp plates secured to the upper ends of mold halves 192 by suitable machine screws. The plug clamps 282 are swung clear of the mold plug carrier shaft 220 when the mold halves or pieces 192 have been opened a total of 10° from the closed position.

The mold halves 192 are locked in the closed blow molding position by a cam-operated mold latch, generally indicated by the numeral 333 in FIGS. 2 and 10. When a molding station 13 on the molding rotary turret 14 approaches cam 248, it also approaches a cam generally indicated by the numeral 351 (FIG. 2) which functions to move the mold latch upwardly to the unlocked position to permit the mold halves 192 to be swung to the open position.

As shown in FIG. 3, each of the molding stations 13 on the molding rotary turret 14 is provided with a stretch pin actuator means, generally indicated by the numeral 372, which will be described in detail after the description of stretch pin means 11.

Stretch Pin Means

As shown in FIG. 11, the stretch pin means 11 includes the stretch pin body 80 through which is longitudinally and slidably mounted the stretch pin 121. The upper end of the stretch pin 121 is slidably mounted in a longitudinal bore 373 of an air nozzle 374, which also functions as a bushing for the upper end of the stretch pin 121. The lower end of the stretch pin 121 is slidably supported in a bore 375 formed longitudinally through a suitable bushing 376 which is threadably mounted in the threaded hole 377 formed in the lower end of the tubular body 80. The bushing 376 is adjustably secured longitudinally in the body 80 by lock nut 378. Stop flange 379 is formed integrally on the stretch pin 121 to limit the downward movement by gravity of the stretch pin 121 in the stretch pin body 80.

The aforedescribed stretch pin cam means 120 moves the stretch pin 121 downwardly in the body 80 until the stop collar 379 engages the upper end of the bushing 376. It will be seen that the initial lowered position of the stretch pin 121 is thus determined by the position of the flange 379 on the stretch pin 121, as well as the relative position of the bushing 376 in the stretch pin body 80.

As shown in FIGS. 11 and 15, the upper end of the air nozzle 374 extends upwardly beyond the upper end of the stretch pin body 80, and it is provided with a conical upper end surface 382 which functions as a bushing for guiding an inverted parison 70 downwardly over the upper end of the stretch pin 121 when the parison is loaded on the stretch pin 121, as the stretch pin passes around the parison loading rotary turret 10.

The conical upper end surface 382 terminates at its lower end in a radial flange 383 which limits the downward movement of the air nozzle 374 in the stretch pin body 80. The upper surface 384 of the flange 383 also forms a shelf or seat for the threaded end 332 of the parison 70.

As shown in FIG. 11, a suitable seal means 385 is operatively mounted in the air nozzle 374 for slidable sealing engagement with the outer surface of the stretch pin 121. As shown in FIG. 12, a retainer hairpin lock, generally indicated by the numeral 386, releasably secures the air nozzle 374 in position in the upper end of the stretch pin body 80. The hairpin lock 386 includes a straight leg portion 387 which is adapted to pass through a hole 388 (FIG. 11) formed by a pair of horizontally aligned arcuate recesses formed on the outer surface of the air nozzle 374 and the inner surface of the stretch pin body 80, respectively. The retainer hairpin lock 386 also includes a curved leg portion 389 which is adapted to be seated in a peripheral arcuate recess 390 (FIG. 11), formed around the outer periphery of the stretch pin body 80. Stretch pin means 11 moved by the transfer means 12 engages circular sprocket 115 on the molding rotary turret 14, such sprocket 115 being secured to the plurality of molding station housings 233 by suitable screws.

As shown in FIG. 11, a cylindrical block 392 is secured together with the block 122 and intermediate shims 393 to the lower end of the stretch pin 121. The block 392 functions as a stop for engagement with the lower end 395 of the bushing 376. The distance between the upper end of the stop block 392 and the lower end 395 of the bushing 376 governs the total upward travel of the stretch pin 121 into a parison 70 for a stretching operation.

As shown in FIGS. 11 and 12, the upper end of the stretch pin body bore 373 is enlarged to form an enlarged bore 398 so as to provide an annular passage 399 for the admission of blow air into the parison 70 for blowing the same into a finished article, as indicated by the bottle 397 in FIG. 11. The lower end of the annular passage 399 communicates with four cross drilled holes 400 that communicate with a second, outer annular passage 401. The annular passage 401 communicates through an opening 402 in the side wall of the stretch pin body 80 with a passage 403 formed in a fitting 404 carried in one of the ring neck clamps 320. The fitting 404 is provided with suitable annular sealing means around the passage 403 for engagement with a stretch pin body 80 when it is in the position shown in FIG. 11. The passage 403 in the fitting 404 communicates with a passage 405 formed through a fitting 406 mounted in a suitable opening in neck ring carrier 320.

Figure 13:
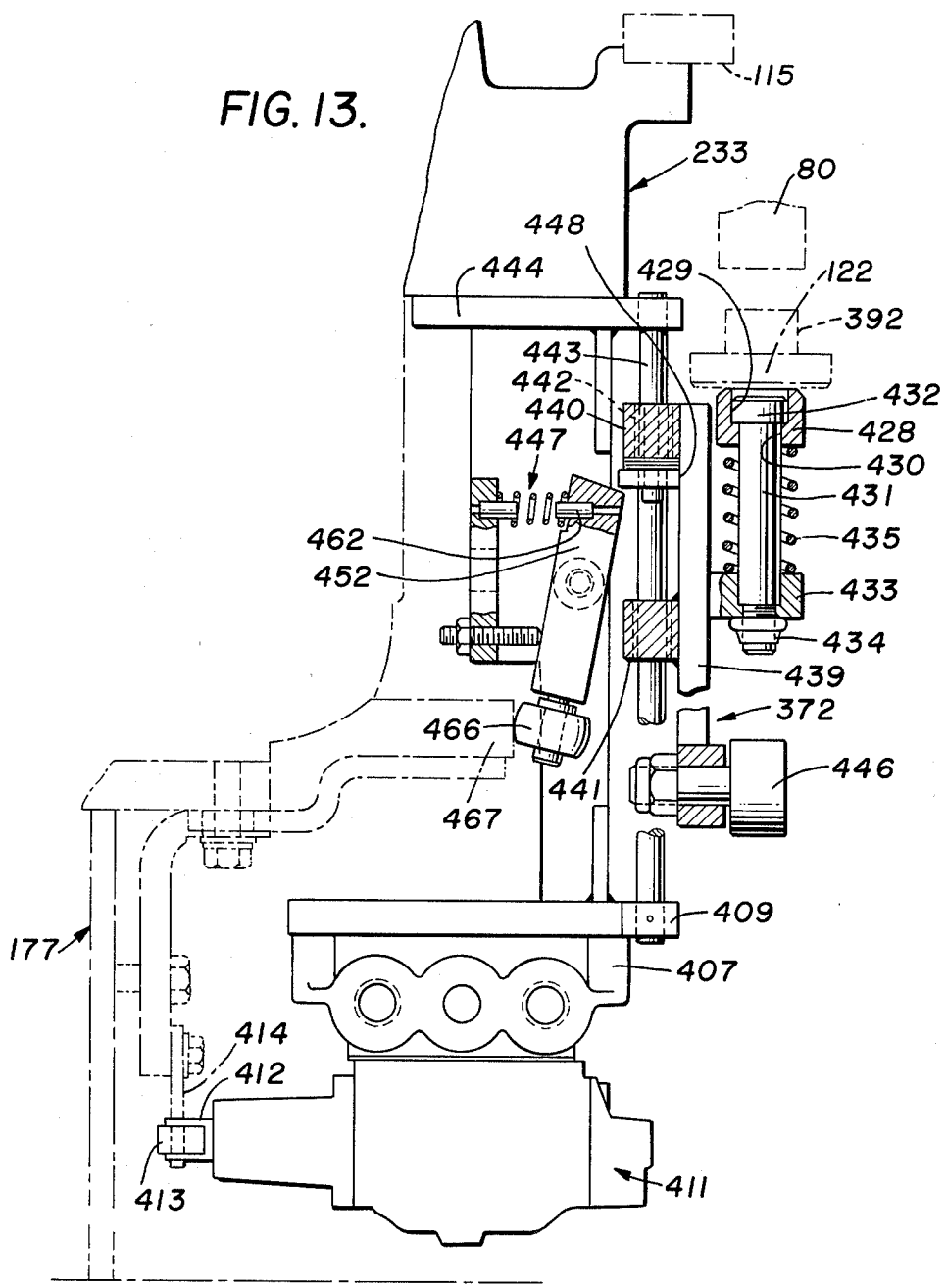
FIG. 13 is a fragmentary, enlarged, partly in section view of the structure illustrated in FIG. 9, and taken in the direction of the arrow "13".

The fitting 406 at each of the molding stations 13 is adapted to be supplied with suitable blow air from a manifold 407 (FIG. 13) carried on the lower end of each of the stretch pin actuator means 372 at each of the molding stations 13. Each of the manifolds 407 is fixed to the lower side of a plate 409 that forms part of each of the stretch pin actuator means 372. As shown in FIG. 9, each of the blow air manifolds 407 is supplied through suitable conduits 418, and shut off and vent valve means 419 that are connected to supply conduits 410 (FIG. 2). The conduits 410 are connected to the rotary manifold 201 and thence to a suitable source of blow air. As shown in FIG. 13, the blow air manifold 407 is operatively connected to a suitable flow control valve 411 for controlling the flow of air from the manifold 407 to the stretch pins 121. The blow air flow control valve 411 is provided with a valve operative shaft 412 which is spring biased outwardly and which carries a cam follower in the form of a roller 413 that operatively engages a circular cam 414. The cam follower 413 on each of the flow control valves 411 is adapted to operatively engage circular cam 414 at the 90° point in counterclockwise travel, as viewed in FIG. 1, to initiate the blowing of a parison 70 into a bottle 397. The admission of blow air is continued through a portion of the rotary travel of the particular molding station 13, after which the cam follower 413 rides off of the circular cam 414, admission of blow air is stopped and the bottle 397 is vented.

The stretch pin 121 is supplied with transfer air for ejecting a finished article 397 from a stretch pin 121 by the following described structure. As shown in FIG. 11, the stretch pin body 80 is provided with a transfer air inlet port 420 which communicates with an enlarged bore 421 in the stretch pin body 80 through which the stretch pin 121 passes. Transfer air is admitted to the inlet port 420 at one of the three stations of the ejection means 17 as described in detail hereinafter. The transfer air passes from the port 420 into the bore 421, and thence downwardly and through four cross drilled holes 422 in the stretch pin 121 and into an axial passage 423. The transfer air flows upwardly through the axial passage 423 of a stretch pin 121 and past a ball check valve 424 and out through four upwardly sloping passages 425 and into the finished article 397 for ejecting the same from a stretch pin 121. It will be seen that the passages 425 have an inner sloping surface relative to the centerline axis of the stretch pin 121. The ball check valve 424 restricts passage of the blow air outwardly through the axial passage 423 during an article blowing operation.

Stretch Pin Actuator Means

FIG. 9 shows a stretch pin 121 in the fully raised position for a blow molding operation. FIG. 11 shows a stretch pin 121 in the initial or lowered position for receiving a fresh parison 70, and for moving the same into one of the molding stations 13 on the molding rotary turret 14. The stretch pin actuator means includes a spring pressure means adapted to engage the lower side of the stretch pin block 122, as shown in FIG. 13. The spring pressure means includes a cylindrical lift block 428, which is provided with a stepped bore therethrough, comprising the bores 429 and 430. Slidably mounted in the larger bore 429 is the head 432 of a shaft 431. Shaft 431 slidably extends down through the smaller bore 430 and has its lower end seated in a suitable bore in a carrier bar 433. The lower end of the shaft 431 is secured in place by a suitable lock nut 434. A coil spring 435 is operatively mounted between the upper face of the carrier bar 433 and the lower face of the lift block 428. It will be seen that the lift block 428 is vertically movable on the shaft 431, and that the spring 435 provides a controllable upward spring pressure or bias on the stretch pin 121. The aforedescribed spring pressure means compensates for errors and tolerances in initial assembly and alignment of the actuator means 372.

As shown in FIG. 13, the carrier bar 433 is fixedly mounted on a cam carrier bar 439 which is fixedly connected to a pair of vertically spaced horizontal bars 440 and 441. Each of the horizontal bars 440 and 441 is slidably mounted on a pair of vertically disposed, laterally spaced apart, slide shafts 443 by means of suitable bushings 442. The upper ends of the slide shafts 443 are fixedly secured in mounting plate 444 that is fixed to the lower end of the respective molding station housing 233. The lower ends of the slide shafts 443 are fixedly connected to the plate 409. As shown in FIG. 13, a cam follower roller 446 is rotatably mounted on the lower end of cam carrier bar 439. The bars 439, 440 and 441 form a slide that carries the cam follower 446 and the aforedescribed spring pressure means for lifting a stretch pin 121.

Figure 17:
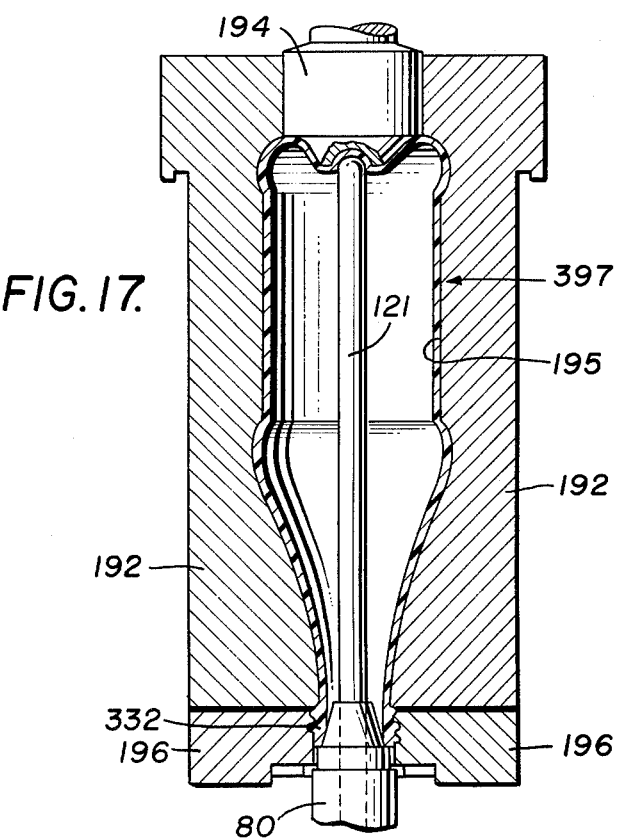
FIG. 17 is a view similar to FIG. 16, but showing the parison blown into a final bottle shape.

FIGS. 9 and 17 show a stretch pin 121 in the fully raised blow molding position. FIG. 9 shows a stretch pin 121 maintained in the raised position by means of a spring biased latch means, generally indicated by the numeral 447. FIG. 13 shows the latch means 447 in the process of being disengaged from a stretch pin cam actuator slide structure to permit downward movement of the stretch pin 121 back to its initial position.

The latch means 447 holds the slide structure carrying the stretch finger spring pressure means in the raised position, as shown in FIG. 9, during a blow molding operation. A horizontal cam 467 is operatively mounted on the rotary turret pedestal structure 177 and cam follower 446 engages its outer edge when a molding station 13 carrying a cam follower 466 passes by the cam 467. As the molding rotary turret 14 continues its counter-clockwise rotation cam roller 466 will be moved radially outward to pivot slide latch 452 in the counterclockwise direction to release the upper end from under striker plate 448 and permit the slide structure carrying the stretch pin spring pressure means and the cam follower 446 to move downwardly. The cam follower 446 and its slide structure and stretch pin spring pressure means come under the control of a cam, supported on the turret base 173 and concentric with turret 14. Such cam controls the movement of the cam follower 446 and its associated stretch pin actuating structure.

As a molding station 13 passes the ejection means 17, and proceeds in its rotary travel, a new parison 70 is brought to the molding station at the appropriate time and the stretch pin 121 carrying the new parison 70 is moved upwardly by the stretch finger actuating means. When the cam follower 446 rides off its associated cam, the slide structure carrying the cam follower 446 drops downwardly a slight distance, as 1/16 inch, to relieve the mechanical pressure on the stretch finger 121, without losing contact between the parison on the stretch finger and the mold end plug 194. The parison 70 is held in axial alignment in the mold, and the mold is then closed and a blow molding operation can be commenced.

Ejection Means

Figure 18:
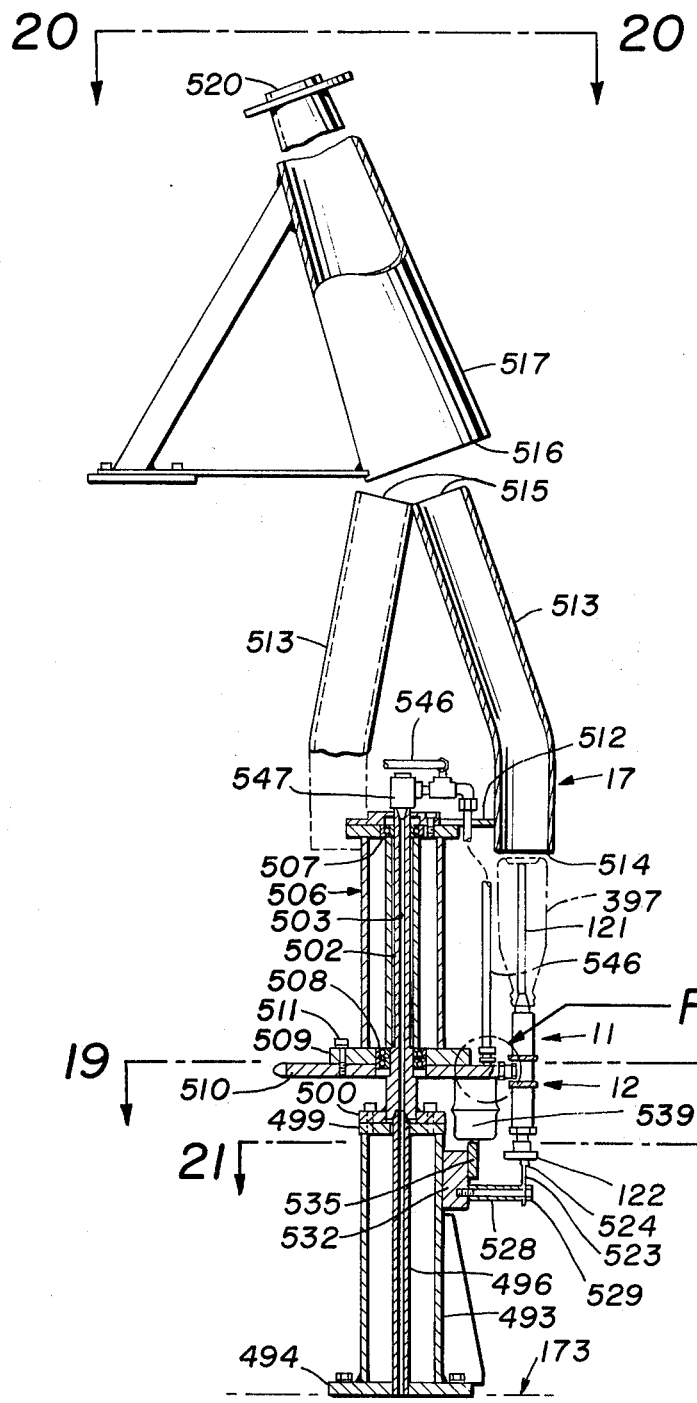
FIG. 18 is a fragmentary, enlarged, elevational section view of the structure illustrated in FIG. 2, taken along the line 18—18 thereof, and looking in the direction of the arrows.

As shown in FIG. 2, the transfer chain 12 conveys the stretch finger assemblies 11 carrying finished articles away from the molding transfer rotary turret 14 and into operative engagement with an ejection means generally indicated by the numeral 17. As shown in FIG. 18, the ejection means 17 includes a fixed column 493 which is fixed on a plate 494 that is secured to the molding turret base 173. A transfer air supply tube 496 extends upwardly through bores formed through base structure 173 and the plate 494, respectively. The tube 496 is connected to a suitable source of pressurized transfer air. As shown in FIG. 18, a cover plate 499 is fixed on the top of the column 493 and has attached thereto a plate 500 by machine screws. A fixed vertical shaft 502 is fixed, as by welding, to the plate 501. The shaft 502 is provided with an axial passage 503 that communicates with the transfer air supply tube 496.

A rotary turret, generally indicated by the numeral 506, is rotatably mounted on the shaft 502 by suitable bearing means 507 and 508. The turret 506 includes a lower circular plate 509 to which is fixedly connected a chain sprocket 510 by suitable machine screws 511.

Figure 20:
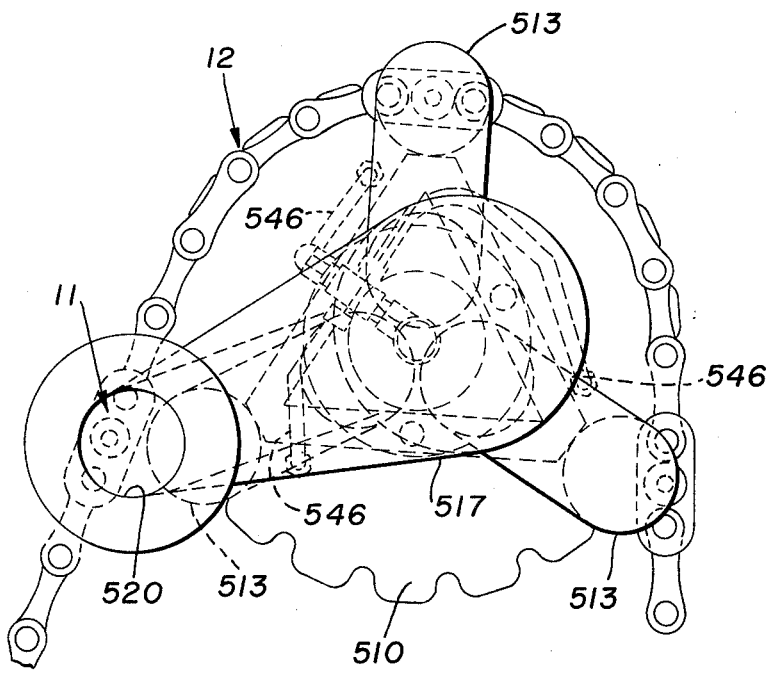
FIG. 20 is a fragmentary, top plan view of the structure illustrated in FIG. 18, taken along the line 20—20 thereof, and looking in the direction of the arrows.

As shown in FIG. 18, the rotary turret 506 carries a fixed plate 512 on its upper end to which is fixedly secured, as by welding, three transfer chutes 513 (FIG. 3) which are spaced about the rotary turret 506 at evenly spaced positions approximately 120° apart (FIG. 20). The lower ends of the chutes 513 are opened, as indicated by the numerals 514, (FIG. 18) and they are each positioned over an article ejection station on the sprocket 510. The upper ends 515 of each of the transfer chutes 513 are open. As shown in FIG. 18, the transfer chute upper ends 515 converge at the open lower end 516 of an upwardly directed funnel chute 517 supported by braces. The upper end 520 of the converging funnel-shaped chute 517 is open and it is adapted to direct an article to a succeeding article processing machine; as a transfer conveyor or the like.

Figure 23:
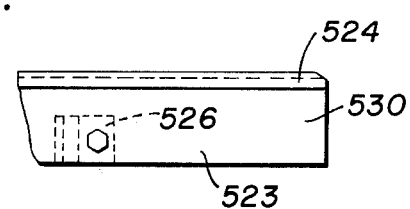
FIG. 23 is a fragmentary, elevational view of the structure illustrated in FIG. 21, taken along the line 23—23 thereof, and looking in the direction of the arrows.

As shown in FIG. 3, the ejection means 17 includes a slide rail 523 which has its leading edge adjacent the point where the transfer chain 12 moves the stretch pin assemblies 11 away from the molding rotary turret 14. The slide rail 523 is provided with a U-shaped slit strip on the upper edge thereof, as shown in FIG. 18. Stretch blocks 122 on the lower ends of the stretch pins 121 are slidably engagable with the upper side of slip strips 524 (FIG. 23), as the stretch pin assemblies 11 are conveyed around ejection means 17.

Figure 21:
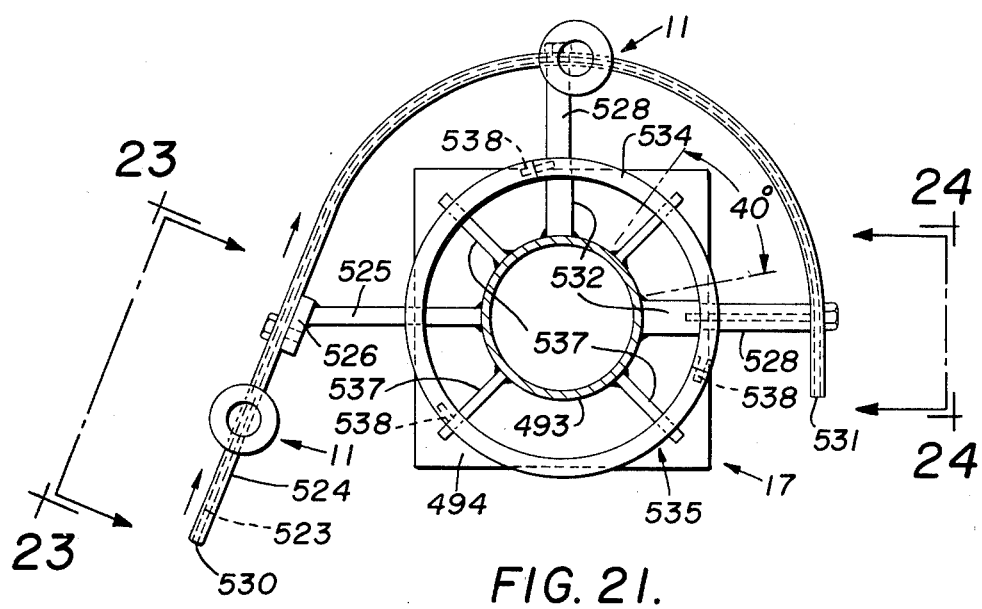
FIG. 21 is a fragmentary, enlarged, horizontal, section view of the structure illustrated in FIG. 18, taken along the line 21—21 thereof, and looking in the direction of the arrows.

As shown in FIG. 21, slide rail 523 has its leading portion attached to a support block 526 fixed to a support arm 525 carried by fixed column 493. Two other support arms 528 fix the middle and discharge portions of slide rail 523 to the column 493 by suitable machine screws. The leading end of slide rail 523 is indicated by the numeral 530 and the discharge end is indicated by the numeral 531. As shown in FIG. 18, each of the support arms 528 is fixed by the machine screws 529 to a block 532 which is secured to column 493.

Figure 25:
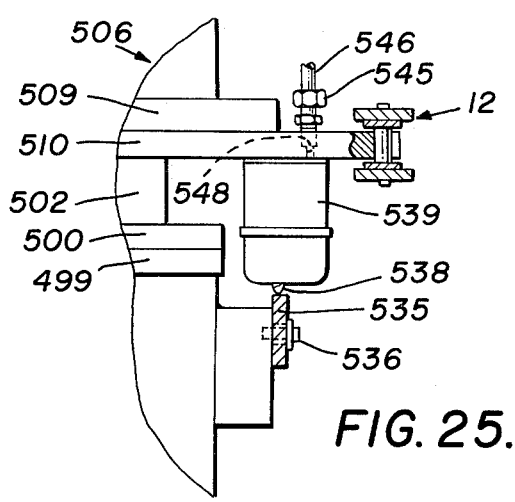
FIG. 25 is a fragmentary, enlarged, elevational section view of the structure illustrated in FIG. 19, taken along the line 25—25 thereof, and looking in the direction of the arrows.

As shown in FIG. 21, a circular cam segment, generally indicated by the numeral 535, is fixedly supported around the column 493. As shown in FIG. 25, cam 535 is supported at two points by a machine screw 536 to the support block 532. As shown in FIG. 21, cam 535 is further supported by additional support arms 537. As shown in FIG. 25, cam 535 is rollably engaged by the cam roller 538 of each of three transfer air valves 539. Each of these transfer air valves 539 is evenly spaced about the sprocket 510 and is fixedly secured to the underside thereof by any suitable means. The transfer air valves 539 are disposed 120° apart so as to coact with each of the transfer chutes 513. The three valve cam rollers 538 are illustrated in FIG. 21 to show their rotary spaced positions.

Figure 22:
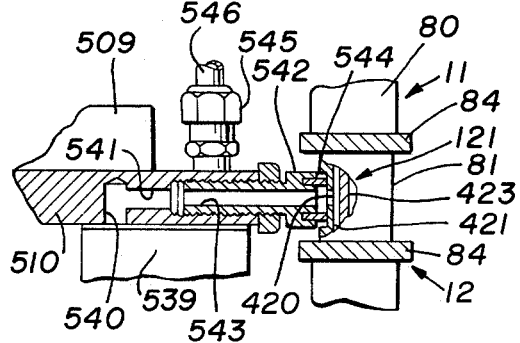
FIG. 22 is a fragmentary, enlarged, section view of the structure shown within the circle marked "FIG. 22" in FIG. 18.

As shown in FIG. 22, each of the transfer air valves 539 is operatively connected with a pair of air passages 540 and 541 in the sprocket 510. The passages 540 and 541 communicate with a passage 543 in a fitting 542. The outer end of the fitting 542 is provided with an annular seal 544 which is adapted to engage against the reduced portion 81 of a stretch body 80 and around a transfer air inlet port 420 for admitting transfer air into passage 421. Each of the transfer air valves 539 is supplied with transfer air through a conduit 546 which is attached by a fitting 545 to a passage 548 in the sprocket 510. The passage 540 communicates with the valve 539. As shown in FIG. 18, the transfer air conduit tubing 546 is operatively connected to a rotary fitting 547 operatively mounted on the upper end of the shaft 502 and communicating with passage 503.

Figure 19:
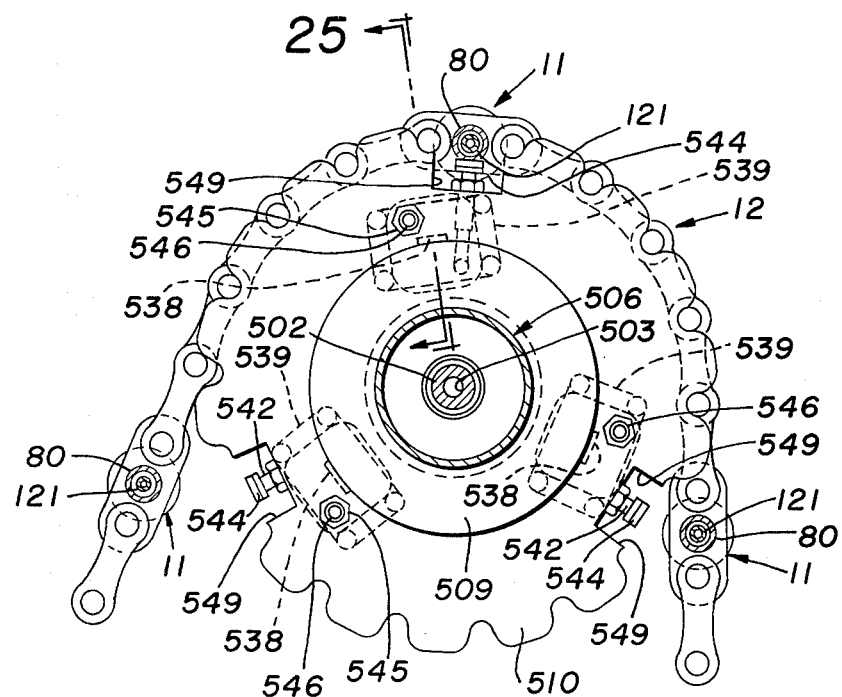
FIG. 19 is a fragmentary, enlarged, horizontal section view of the structure illustrated in FIG. 18, taken along the line 19—19 thereof, and looking in the direction of the arrows.
Figure 24:
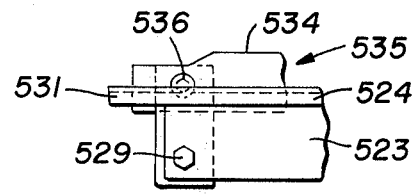
FIG. 24 is a fragmentary, elevational view of the structure illustrated in FIG. 21, taken along the line 24—24 thereof, and looking in the direction of the arrows.

As illustrated in FIGS. 19 and 20, when the transfer chain 12 conveys a stretch pin assembly 11 from the molding rotary turret 14 to the transfer means 17, one of the transfer air valves 539 is arranged so as to be positioned with its respective fitting 542 disposed adjacent the transfer air inlet port 420 of the stretch pin assembly 11. As shown in FIG. 19, sprocket 510 is provided with three notches 549 in which are received the stretch pin assemblies. FIG. 20 shows that the transfer chutes 513 are also positioned to coact with the transfer air valves 539. As the stretch pin assemblies 11 are conveyed around the ejection means 17 by the sprocket 510, the air valve cam rollers 538 pass over a raised portion 534 of the cam 535 (FIG. 24), for a rotary distance of about 40° during which time pressurized transfer air is admitted through the respective valve 539 so as to blow off the finished article 397 upwardly through the respective chute 513 and into the chute 517. The chute may also be provided with a vacuum to ensure passage of the finished article 397 through the chute 517 to a succeeding processing operation.

OPERATION

In use, power drive means 189 rotates the molding rotary turret 14 and drives transfer chain 12, which in turn drives the parison loading rotary turret 10. As transfer chain 12 moves a stetch pin assembly 11 into the parison loading rotary turret 10, the stretch pin assembly is disposed under one of the loading chutes 40. As each stretch pin assembly 11 moves under the parison loading position, it has a parison 70 loaded onto its stretch pin 121. Continued movement of the transfer chain 12 moves the parison loaded stretch pin assembly 11 around the input idler means 91 and into operative location in one of the molding stations 13. Sprocket 115 on molding rotary turret 14 locates a stretch pin assembly 11 in each molding station 13 and the mold halves are moved to their closed positions. Stretch pin 121 is moves upwardly by the stretch pin actuator means to stretch the parison thereon until it enagages the mold end plug 194.

The stretch pin finger 121 is then held in the elevation position by the spring biased latch 452. The blow air is then actuated to blow the parison 70 outwardly into the final formed article 397, as shown in FIG. 17. Continued movement of the particular molding station 13 then causes the mold to open, and the particular stretch pin assembly 11 to be moved to the ejector means 17, where the finished article 397 is ejected, as described hereinbefore. The stretch pin assembly 11 then continues on through the cam means 120 which moves the stretch pin 121 downwardly to the initial parison receiving position, and the stretch pin assembly is moved to the parison loading position for another cycle.

While it will be apparent that the preferred embodiment of the invention herein disclosed is well calculated to fulfill the objects above stated, it will be appreciated that the invention is susceptible to modification, variation and change.

We claim:

1. In a continuous motion stretch blow molding apparatus, for blow molding hollow articles from tubular parisons, the combination comprising:
    A. a continuous motion transfer means;
    B. a plurality of upwardly disposed stretch pin means operatively carried on said transfer means, each stretch pin means including:
        a. a stretch pin body and a stretch pin provided with:
            i. first passage means for conveying blow air into a parison carried on a stretch pin means to blow such parison into the shape of a final article;
            ii. second air ejection passage means for conveying transfer air into said final article carried on such stretch pin means; and
        b. valve means operatively associated with the air ejection passage means and responsive to the pressure of the blow air to prevent blow air from exiting through the air ejection passage means during forming of said final article;
    C. a continuous motion rotary parison loading turret for receiving parisons and for sequentially loading them onto said stretch pin means;
    D. a continuous motion rotary molding turret having a plurality of molding stations;
    E. said transfer means being operative to locate each of said stretch pin means with a parison loaded thereon in an individual one of said molding stations for a stretching, blowing and cooling operation on each parison on each stretch pin means to form an article from each parison; and
    F. pressurized fluid ejection means successively cooperable with the second air ejection passage means of each stretch pin means to eject each article upwardly from each stretch pin means.

2. In a continuous motion stretch blow molding apparatus for blowing molding hollow articles from tubular parisons having one open end and one closed end, the combination comprising:
    a. a continuous motion transfer means;
    b. a plurality of upwardly disposed stretch pin means operatively carried on said transfer means;
    c. a continuous motion rotary parison loading turret for receiving preheated parisons and for sequentially loading them onto said stretch pin means;
    d. a continuous motion rotary parison molding turret having a plurality of molding stations;
    e. said transfer means being operative to locate each of said stretch pin means with a parison loaded thereon in an individual one of said molding stations for a stretching, blowing and cooling operation on each parison on each stretch pin means to form an article from each parison;
    f. ejection means operatively positioned between said molding rotary turret and said rotary parison loading turret for ejecting a final article from the stretch pin means;
    g. means between the molding turret and ejection means for maintaining a stretch pin member of each stretch pin means in extended position to aid in holding said final article in substantially vertical position on the stretch pin means substantially until such final article is ejected from the stretch pin means; and
    h. means between the ejection means and rotary parison loading turret for moving each stretch pin member of each said stretch pin means to a parison loading position prior to movement of said stretch pin means into operative engagement with the rotary parison loading turret.

3. A continuous motion stretch blow molding apparatus as defined in claim 2, wherein said ejection means includes:
   a. a rotary turret around which said transfer means passes;
   b. a transfer air station on said rotary turret;
   c. means on said rotary turret for locating a stretch pin means at said transfer air station;
   d. a transfer air valve operatively mounted at said transfer air station; and
   e. means for selectively operating said transfer air valve at a predetermined point as each stretch pin means is moved around said rotary turret for ejecting a final article carried on a stretch pin means.

4. A continuous motion stretch blow molding apparatus as defined in claim 3, wherein:
   a. said means on said rotary turret for locating a stretch pin means at said transfer air station includes a sprocket having a notch for receiving a stretch pin body of a stretch pin means.

5. A continuous motion stretch blow molding apparatus as defined in claim 3, including:
   a. transfer chute means operatively located over said transfer air station for receiving a final article ejected from a stretch pin and conveying it away from the molding apparatus.

6. A continuous motion stretch blow molding apparatus as defined in claim 5, wherein:
   a. said transfer chute means includes a plurality of transfer chutes disposed over a plurality of said transfer air stations with each transfer chute having a lower end disposed over one of said transfer air stations, and a funnel chute having a lower end disposed over the upper ends of said transfer chutes for receiving articles from said transfer chutes and conveying them from the molding apparatus.

7. A continuous motion stretch blow molding apparatus as defined in claim 6, wherein:
   a. said transfer chute means are rotatably mounted so as to have each of said transfer chutes rotate with its respective transfer air station.

8. A continuous motion stretch blow molding apparatus as defined in claim 3, wherein:
   a. said means for selectively operating said transfer air valve includes a cam means.

9. in a continuous motion stretch blow molding apparatus for blow molding hollow articles from tubular parisons at orientation temperature having one open end and one closed end, the combination comprising:
   a. a continuous motion parison transfer means;
   b. a plurality of upwardly disposed stretch pin means carrying said open ends of said parisons in a fixed plan of travel and operatively carried on said transfer means, each stretch pin means including a stretch pin mounted for axial movement;
   c. a continuous motion rotary parison loading turret for receiving said parisons and for sequentially loading them onto said stretch pin means;
   d. a continuous motion rotary molding turret having a plurality of molding stations movable through a circular path with said turret, each molding station including:
      i. stretch pin actuator means for axially raising one of said stretch pins to an extended position;
      ii. means for selectively introducing fluid under pressure through said stretch pin means substantially after completion of said raising movement; and
      iii. means engaging said stretch pin actuator means for maintaining the stretch pin in extended position during introduction of said fluid into a parison and subsequent cooling of an article blown therefrom as each such station moves along said circular path;
   e. said transfer means being operative to locate each of said stretch pin means with a parison loaded thereon in an individual one of said molding stations;
   f. ejection means operative to eject one of said hollow articles upwardly from each stretch pin means after leaving a molding station;
   g. means concentric with and disposed in fixed position adjacent said rotary molding turret beneath the mold stations to sequentially elevate and lower each of the stretch pin actuator means at preselected positions of a mold station along its rotary path of movement; and
   h. means for successively disengaging the means of (d)(iii) before a mold station reaches the position in its rotary path of movement whereat the stretch pin actuator means is lowered.

10. The apparatus of claim 9 including:
means for successively actuating the means of (d)(ii) after elevation of the stretch pin actuation means.

11. The apparatus of claim 9 including: a slide rail disposed in a plane immediately below the extended position of each stretch pin and situated between the molding turret and ejection means to aid in holding said final article in substantially vertical position until ejected by the ejection means.

* * * * *